(12) United States Patent
Benayoun et al.

(10) Patent No.: US 6,381,253 B1
(45) Date of Patent: Apr. 30, 2002

(54) DATA TRANSMISSION SYSTEM AND METHOD FOR INTERCONNECTING SENDING AND RECEIVING ANALOG DEVICES PRIMARILY THROUGH DATA CHANNELS

(75) Inventors: Alain Benayoun, Cagnes sur Mer; Patrick Michel; Dominique Vinot, both of La Gaude; Jean-Francois Le Pennec, Nice, all of (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/046,489

(22) Filed: Mar. 23, 1998

(30) Foreign Application Priority Data

Sep. 9, 1997 (EP) .............................................. 97480061

(51) Int. Cl.$^7$ ............................. H04L 12/16; H04J 3/12

(52) U.S. Cl. ....................................... 370/522; 370/264

(58) Field of Search ................................. 370/419, 463, 370/465, 522, 524, 264

(56) References Cited

U.S. PATENT DOCUMENTS

| | | | | | |
|---|---|---|---|---|---|
| 5,515,373 | A | * | 5/1996 | Lynch et al. .................. | 370/79 |
| 5,598,401 | A | * | 1/1997 | Blackwell et al. ............ | 379/94 |
| 5,621,731 | A | * | 4/1997 | Dale et al. ..................... | 370/79 |
| 5,752,076 | A | * | 5/1998 | Munson ....................... | 395/825 |
| 5,815,505 | A | * | 9/1998 | Mills ........................... | 370/522 |
| 6,023,724 | A | * | 2/2000 | Bhatia et al. ................ | 709/218 |
| 6,028,848 | A | * | 2/2000 | Bhatia et al. ................ | 370/257 |
| 6,029,203 | A | * | 2/2000 | Bhatia et al. ................ | 709/244 |
| 6,041,116 | A | * | 3/2000 | Meyers ........................ | 379/244 |
| 6,052,803 | A | * | 4/2000 | Bhatia et al. ................. | 714/49 |

\* cited by examiner

Primary Examiner—Dang Ton
Assistant Examiner—Toan Nguyen
(74) Attorney, Agent, or Firm—Scott W. Reid

(57) ABSTRACT

In a system and method of setting a data communication through an Integrated Service Digital Network (ISDN) between a transmitting analog device connected to a transmitting Terminal Adapter interfacing the ISDN network, a receiving analog device is connected to a receiving Terminal Adapter interfacing the ISDN network in a data communication system wherein a plurality of transmitting analog devices are connected and transmit data to a plurality of receiving analog devices primarily through a data channel and without device identification therein.

3 Claims, 2 Drawing Sheets

DATA TRANSMISSION SYSTEM AND METHOD FOR INTERCONNECTING SENDING AND RECEIVING ANALOG DEVICES PRIMARILY THROUGH DATA CHANNELS

BACKGROUND OF THE INVENTION

1. Technical Field of the Invention

This invention relates to data transmission systems, e.g., Integrated Services Digital Network (ISDN) and methods of operation. More particularly, the invention relates to a data transmission system and method for interconnecting sending and receiving analog devices, primarily through data channels and without device identification.

2. Background Discussion

It is now classical to exchange digital data between two digital Data Terminal Equipments (DTE) over the Integrated Service Digital Network (ISDN).

The DTE are connected to the ISDN network by means of Terminal Adapters the function of which is to set the communication through the ISDN D channel and then, to monitor the quality of the line and to wait for the disconnection.

It is also possible to transport data from an analog Terminal to another analog Terminal (such as two fax devices) over the ISDN network after the analog signals have been encoded into digital form by a pulse code modulation (PCM) or other type of coding.

A problem is raised when several analog Terminals are multiplexed and share the same line. There is generally no problem in the switched network (PSTN) environment insofar as the difference in the setting delay of each equipment is used to avoid that two or more devices answer simultaneously. But, in the ISDN network environment, it is necessary to transport some information elements used to identify the analog device being called. Such information elements are specific words within the D channel. Unfortunately, the protocol used for the D channel (LAPD) being restraining, these information elements may not be recognized in some cases or not transported at all by the carrier as it is the case in some countries.

SUMMARY OF THE INVENTION

Accordingly, an object of the invention is to provide a reliable method of setting the communication over the ISDN between a transmitting analog device and a receiving analog device among a plurality of receiving analog devices.

Another object is a system and method for interconnecting sending and receiving analog devices in a data transmission system primarily through data channels in such systems.

Another object is a system and method for interconnecting sending and receiving analog devices without identification using tones and data channels of the data transmission system.

Another object is a system and method for interconnecting sending and receiving analog devices in a data transmission system using a data base for connecting unrecognized tones to the most appropriate analog device.

Another object is a system and method for interconnecting sending and receiving analog devices in a data transmission system in which a data base is updated for connecting unrecognized tones to the most appropriate analog device after establishment of a successful connection.

These and other objects, features and advantages are achieved in a system and a method of setting data communication between a transmitting analog device and a receiving analog device in a data communication system wherein a first plurality of transmitting analog devices connected to a transmitting Terminal Adapter interfacing a communication network including an Integrated Service Digital Network (ISDN) can transmit data to a second plurality of receiving analog devices connected to a receiving Terminal Adapter interfacing the same network. The system is characterized in that the calling tone sent by the transmitting analog device for identifying and initializing the receiving analog device is transported over the ISDN network within the B channel.

The method comprises the following steps:

(a) After the transmitting analog device has dialed the identification number of the receiving Terminal Adapter, the transmitting Terminal Adapter sends a SETUP message containing the identification number to the receiving Terminal Adapter, this message being transported over the ISDN network within the D channel;

(b) The receiving Terminal Adapter connects the receiving analog device to the ISDN network by allocating a B channel to the receiving analog device;

(c) The receiving Terminal Adapter sends back a CONNECT message to the transmitting Terminal Adapter to indicate that the communication setting is accepted;

(d) The transmitting Terminal Adapter connects the transmitting analog device to the ISDN network by allocating a B channel to the transmitting analog device;

(e) The calling tone generated by the transmitting analog device is transported from the transmitting Terminal Adapter to the receiving Terminal Adapter over the ISDN network within the B channel; and (f) A ring signal is sent by the receiving Terminal Adapter to the receiving analog device.

BRIEF DESCRIPTION OF THE DRAWINGS

The above set forth and other objects and features of the invention will be made clear in reading the following description of the best embodiment in reference to the accompanying drawings wherein.

DETAILED DESCRIPTION OF THE INVENTION

First, it must be noted that the invention does not modify the standard procedures used as well in the switched network as in the ISDN network. Thus, the initial phase for setting the connection of two analog devices is made according to V25 standard, the negotiation phase is performed in accordance with the standards used by the implied analog devices (V32, V32 bis . . . ), and the protocol for setting the connection over the ISDN network is according to the standard used in the country wherein the connection takes place.

Figure 1:
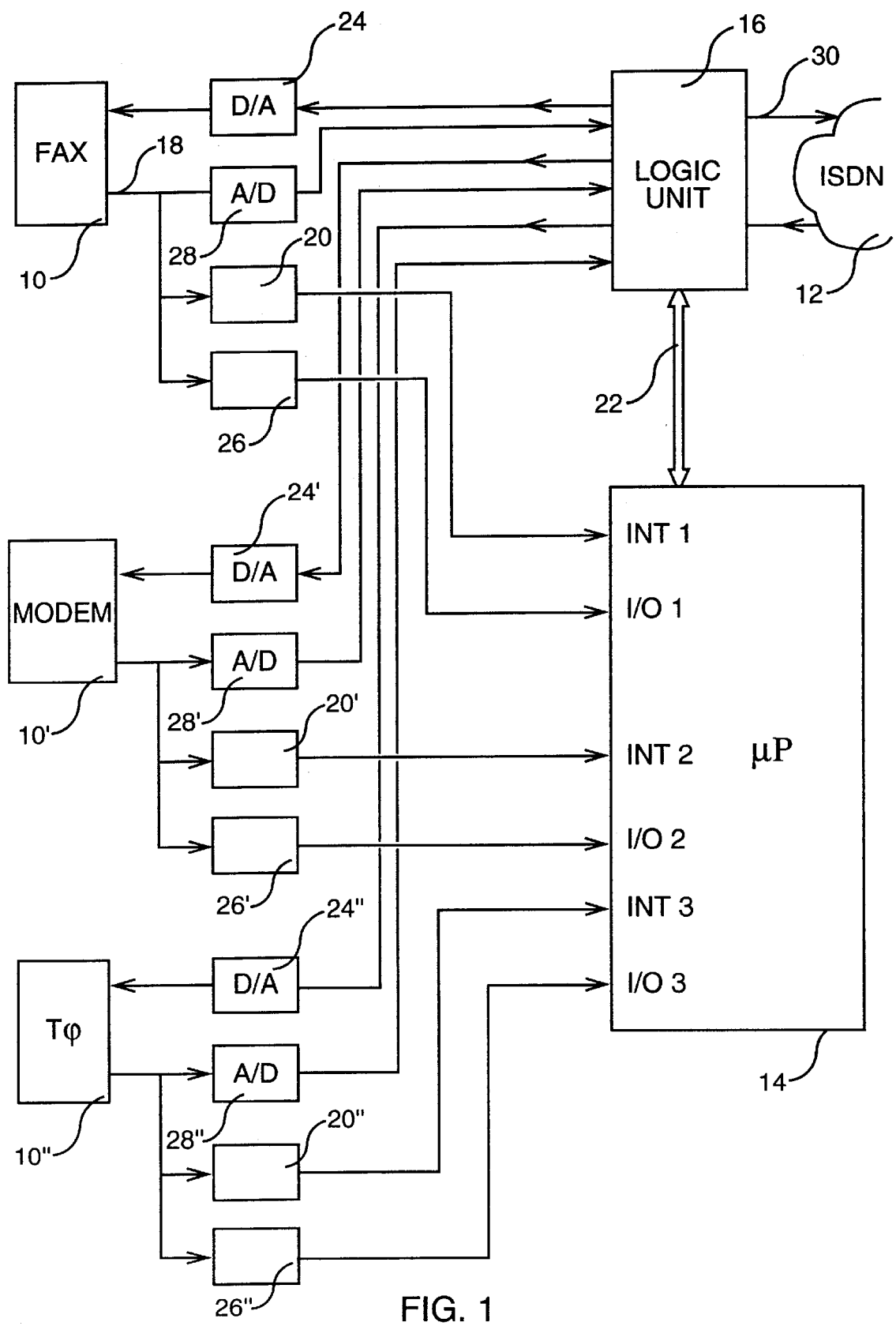
FIG. 1 is a block-diagram representing the mechanism enabling several calling analog devices to be connected in a system and method according to the invention.

As illustrated in FIG. 1 showing the calling side of a system implementing the invention, three different analog devices are commonly used in such system : a fax 10, a modem 10' and telephone set 10". Of course, there could be a plurality of fax devices, a plurality of modems and a plurality of telephone sets.

Figure 2:
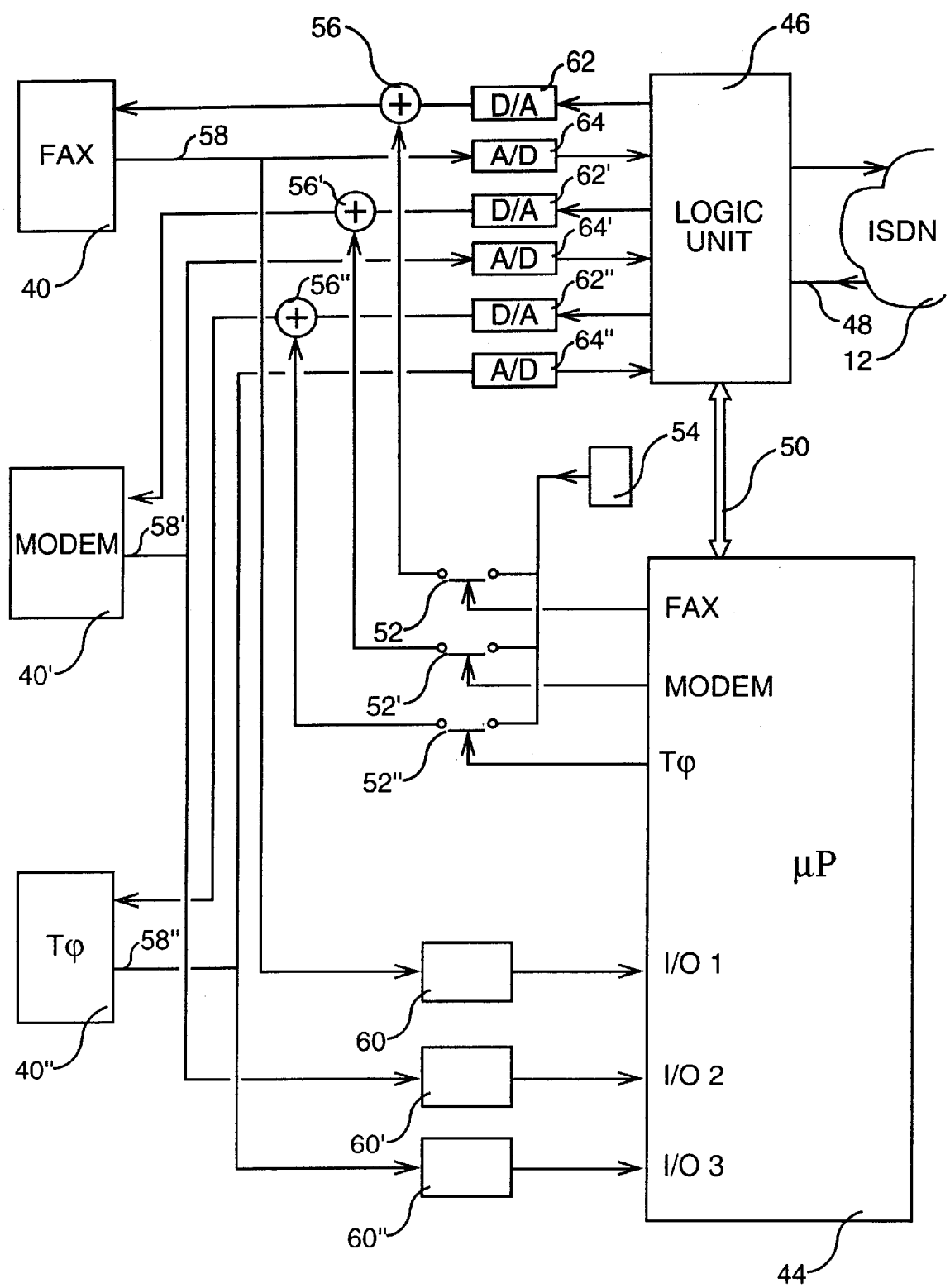
FIG. 2 is a block-diagram representing the mechanism enabling several analog devices to be called by a calling analog device in a system and method according to the invention.

In the same way, though FIG. 2 shows only three analog devices which can be called: a fax 40, a modem 40' and telephone set 40", it is clear that the principles of the invention are also applied with a plurality of fax devices, a plurality of modems and a plurality of telephone sets.

Before describing the sequence of steps used to set a communication between a calling analog device and a called analog device according to the invention, it is useful to point out that the interface with the ISDN network at either side, is principally formed of a data processing unit such as a microprocessor which can be the same microprocessor normally used in the Terminal Adapter (not shown here) interfacing with the ISDN network, and a logic unit. The function of this logic unit is on the one hand to serialize the words received from the data processing unit (or de-serialize the data to be sent to the data processing unit) and on the other hand to select the input and output connections between the calling analog devices and the ISDN network.

The use of a Terminal Adapter (TA) to interface a Data Terminating Equipment (DTE) to an ISDN is shown in FIG. 1 of U.S. Pat. No. 5,519,703 to Chauffour et al., which patent is assigned to the assignee of the present application and which is incorporated herein by reference in its entirety. In that figure, TA 20 interfaces calling DTE to the ISDN 50, TA 60 interfaces calling DTE 70 to the ISDN and TA 30 interfaces called DTE 40 to the ISDN. The TAs in that figure are approximately analogous to the microprocessor/logic unit combination of the present application, as shown in FIGS. 1 and 2.

Thus, in FIG. 1, calling analog devices 10, 10' and 10" are connected to ISDN network 12 by the intermediary of microprocessor 14 and logic unit 16. In FIG. 2, called analog devices 40, 40' and 40", are connected to ISDN network 12 by the intermediary of microprocessor 44 and logic unit 46.

Note that, as well for the mechanism of FIG. 1 as for the mechanism of FIG. 2, all other circuits used to implement the invention and their functions will be described in the sequential steps of the following procedure for setting a communication between fax device 10 and fax device 40.

Communication Setting

When the device is ready to transmit either by unhooking the telephone set or by any other initialization operation, a "hook on" signal is sent on line 18 by fax 10. This signal is decoded by hook on decoder 20 so that the decoded signal INT 1 is used as an interrupt to microprocessor 14.

In answer to the interrupt, microprocessor 14 activates logic unit 16 by sending thereto a digital signal "carrier frequency" which is an invitation to dial by means of data bus 22. After being serialized by logic unit 16, the carrier frequency signal is converted into an analog signal by digital-to-analog converter 24 and transmitted to fax device 10.

After detection of the carrier frequency signal, the identification number of the called device is dialed by fax device 10.

The identification number is received and decoded by line dialing decoder. The resulting digital signal is sent as I/O 1 to microprocessor 14 which stores it into its internal RAM.

At the same time, fax device 10 transmits its calling tone (a 1100 Hz signal for the fax device) which is converted by analog-to-digital converter 28 into a digital signal. The digitalized calling tone received in serialized from by logic unit 16 is sent as a data word to the microprocessor 14. In most cases, the calling tone is regularly sent by fax device until it is accepted by microprocessor 14. However another possible way consists in storing it into the internal RAM.

A call request is generated in microprocessor 14 for the preparation of a data block containing the identification number of the called device.

1. Microprocessor 14 prepares a "setup" message with the data block containing the identification number and sends it to logic unit 16.
2. The setup message is transmitted by logic unit 16 on line 30 over ISDN network 12. At the receiving side, the setup message is received on line 48 (see FIG. 2).

After being de-serialized by logic unit 46, the setup message is received by microprocessor 44 by means of data bus 50. It must be noted that in the current technique the setup message contains the identification number of the Terminal Adapter to which is connected a single ISDN Terminal. In the present case, there is no identification of the analog device being called in the setup message.

In the same time the setup message is transmitted over the ISDN network, this one sends back a "call proceeding" signal to microprocessor 14.

3. After the setup message has been received by microprocessor 44, this one activates a signal "call accepted".

Then, a signal "connect" is sent by logic unit 46 over ISDN network 12.

An acknowledgment is then sent back by the ISDN network to logic unit 46, this signal being intercepted by microprocessor 14 which regularly polls said logic unit.

4. Then, ISDN network 12 allocates a B channel (via the Terminal Adapter not shown) to the connection being set. Microprocessor 44 is thus aware of the B channel it has to "listen to".

After the signal "connect" has been transported over the ISDN network to the calling side, the Terminal Adapter allocated a B channel (which may not be the same B channel as the B channel allocates at the other side) to the connection being set. Microprocessor 14 is therefore aware of the B channel it has to use.

The calling tone received from fax device 10 (on a retry basis) or stored in the internal memory of microprocessor 14 is then transported over ISDN network 12 to logic unit 46.

5. Microprocessor 44 listening to the B channel which has been allocated to the connection, detects the calling tone from fax device 10 and activates switch 52 corresponding to fax device 40 which is called.
6. A ring signal is sent from ring generator 54 to fax device 40 by means of summing circuit. Note that such a signal having a voltage of 40 volts and a frequency of 50 Hz can easily overlap any other signal from logic unit 46.

Receiving the ring signal, fax device 40 performs the operation of unhooking and transmits a "hook on" signal on line 58 to hook on decoder 60.

The decoded "hook on" signal transmitted by hook on decoder 60 is detected by microprocessor 44 on terminal I/O 1. In answer to this signal, microprocessor 44 enables the calling tone received on the ISDN B channel to be transmitted from logic unit 46 to fax 40 by means of digital-to-analog converter 62 and summing circuit 56.

Fax device 40 answers back an answering tone to the calling fax device 10 by using the ISDN B channel which has been allocated to the connection.

At last, a handshaking negotiation takes place between Fax device 10 and Fax device 40, such a negotiation being necessary to adapt the communication protocols, the exchange speed, etc., before the data communication between the two devices can start. Note that the data sent from fax device 40 on line 58 are converted from analog form into digital form by analog-to-digital converter 64 before being transported over ISDN network 12.

When the communication is established between the two fax devices, the data exchanged between the two devices are always transported in the B channel which has been allocated on each side of the network.

It must be noted that the above description can be applied to the setting of a communication between two analog devices other than fax devices. As illustrated in FIGS. 1 and 2, the circuits are identical for all analog devices and therefore, the references designating the circuits associated with another analog device, are the same references as for the fax devices but with ' and". Thus, the modem is referenced 10' or 40' and the telephone set is referenced 10" or 40".

Each type of analog device which can be used with the invention, recognizes a specific calling tone when called. Thus, the calling tone recognized by a fax device is a 1100 Hz signal, the calling tone recognized by a modem is a 1300 Hz signal, etc. . . . When there are a plurality of analog devices of the same type which are connected to a Terminal Adapter (for example several fax devices), it is necessary that microprocessor 44, knows which one of said plurality of devices has to be rung by means of ring generator 54 and a switch 52. Therefore, it is necessary for the microprocessor to store in RAM a priority list of the analog devices. When the first device of the list cannot be connected because it is already connected or has failed, the microprocessor selects the second or one of the list, and so on . . .

In addition to the above method of communication setting, a feature of the invention allows the connection of not recognized data to the most appropriate device when the system does not fully recognize the calling tone. For this, microprocessor 14 or 44 stores a database including a set of words as follows:

| data element 1 | data element 2 | Tone A | Tone B | DEV 1 | DEV 2 | DEV 3 |
|---|---|---|---|---|---|---|

Some of the words included in the database field correspond to data elements or tones which are identified each time a connection is requested.

A priority list of analog devices is built by default. When unrecognized data are received, the system first tries to connect them to the device having the priority 1 on the list. If the connection fails, the database is modified by changing the contents of a word DEV1 corresponding to the identified data and indicating that priority 1 device has failed with this kind of data. If the calling device tries again to call, the priority 1 device is excluded as bad device and the microprocessor tries to connect the data to the priority 2 device, and so on . . . . When a connection is successful, (for example, with the priority 3 device), the database field is updated (for example DEV3) with information indicating that the corresponding device accepts this kind of data. Then, further calls with this type of data will try to connect to priority 3 device and with the following devices on the list if the connection aborts.

Note that a different database field is built for each type of different data which are identified by the system. Later, database fields are analyzed to find common information in order to group fields having similar information elements.

Each time a new call is received and not well identified, it will be compared to the data elements of each database field using a bit by bit sliding window to recognize patterns. Tones will be identified and stored with length, frequency and delay to facilitate the search.

Accordingly, such a self learning mechanism enables a data communication system to recognize new devices without the need to upgrade the system of recognition. With call retry from the calling device, there is no failing call when the calling device and the protocol are not clearly identified.

What is claimed is:

1. Data transmission system interconnecting a plurality of transmitting analog devices and a plurality of receiving analog devices through a communication network including an ISDN, comprising:

(a) means connecting said plurality of transmitting analog devices to a transmitting terminal adapter interfacing said ISDN;

(b) means connecting said plurality of receiving analog devices to a receiving terminal adapter interfacing said ISDN;

(c) means connecting each of said transmitting analog devices to said terminal adapter and each of said receiving analog devices to said terminal adapter through a microprocessor for intercepting a calling tone from each of said transmitting analog devices, said microprocessor having a database stored in memory accessible thereto which includes fields containing information enabling unrecognized data to be forwarded to one analog device among a priority list of analog devices, each of said database fields including data elements or tones which may correspond to one of said analog devices; and (d) means for allocating a B channel for transporting said calling tone over said ISDN network.

2. System according to claim 1, wherein a logic unit is associated with said microprocessor in order to de-serializing data received from each of said analog device and before providing them to said microprocessor, serializing data received from said microprocessor and before providing them to each of said analog device, and connecting said each of analog device to said ISDN network under the control of said microprocessor.

3. System according to claim 1, wherein a comparison is made with said data element and tones of each database field when unrecognized data are received so that a database field may be selected, and wherein said field includes information (DEV1, DEV2 . . . ) indication which one of said receiving analog devices must be connected.

* * * * *